United States Patent [19]

Sadahiro et al.

[11] Patent Number: 4,674,374
[45] Date of Patent: Jun. 23, 1987

[54] BAND SAW MACHINE

[75] Inventors: Toru Sadahiro, Tokyo; Masayuki Taguchi, Hatano; Toru Tokiwa, Odawara; Takeshi Terajima, Sagamihara, all of Japan

[73] Assignee: Amada Company, Limited, Japan

[21] Appl. No.: 748,678

[22] Filed: Jun. 25, 1985

[30] Foreign Application Priority Data

| Jun. 25, 1984 | [JP] | Japan | 59-129110 |
| Dec. 4, 1984 | [JP] | Japan | 59-255141 |
| Dec. 5, 1984 | [JP] | Japan | 59-183583[U] |
| Dec. 5, 1984 | [JP] | Japan | 59-183584[U] |
| Dec. 7, 1984 | [JP] | Japan | 59-257482 |
| Jan. 18, 1985 | [JP] | Japan | 60-004070[U] |

[51] Int. Cl.$^4$ .......................... B26D 7/24; B23D 53/00
[52] U.S. Cl. ......................................... 83/62.1; 83/72; 83/360
[58] Field of Search .................. 83/62.1, 72, 74, 360

[56] References Cited

U.S. PATENT DOCUMENTS

| 2,914,100 | 11/1959 | Lindholm | 83/74 |
| 4,085,636 | 4/1978 | Eklund | 83/74 X |
| 4,355,555 | 10/1982 | Kobayashi et al. | 83/62.1 |
| 4,437,367 | 3/1984 | Hauser | 83/72 X |
| 4,557,168 | 12/1985 | Tokiwa | 83/72 X |

*Primary Examiner*—James M. Meister
*Attorney, Agent, or Firm*—Wigman & Cohen

[57] ABSTRACT

A band saw machine is provided with a fixed and movable blade guide arm which are set apart by a distance which is proportional to the width of workpiece to be cut. A detector mounted on one of the guide arms senses the lateral deviation of the saw blade during cutting and a control circuit outputs a termination signal to shut down the machine when the deviation is larger than a desired maximum value. When a workpiece of a different width is to be cut the guide arms are reset apart by a distance proportional to the width of the new workpiece and a detector is provided which senses the change of distance between the guide arms and outputs a signal to a revising circuit. The revising circuit then revises the maximum value of deviation to be allowed based on the change of distance between the guide arms.

3 Claims, 13 Drawing Figures

BAND SAW MACHINE

BACKGROUND OF THE INVENTION

1. Field of the Invention

The present invention relates to a band saw machine in which the action of sawing a workpiece is produced by means of an endless band saw blade which runs on both a driving wheel and a driven wheel. Specifically, the present invention relates to a band saw machine wherein it is possible to automatically revise the allowable value for the deviation of cut in proportion to the width of the workpiece to be cut; to detect the when the band saw blade comes off the driving wheel or off the driven wheel; to easily replace a rotating wire brush for brushing off the sawdust adhering to the band saw blade; to cover the exposed section of the band saw blade for safety; to automatically feed the workpiece material repeatedly and to detect the fact that the workpiece has become shorter than a fixed dimension when fixed dimension cuts are being carried out on the workpiece; and to smoothly discharge the sawdust or chips produced by the action of sawing the workpiece, from inside a box-shaped base.

2. Description of the Prior Art

In the well-known horizontal type of band saw machine, a main body vise device for securing the workpiece is provided on a box-shaped base which supports a workpiece which is to be sawn. A freely elevatable cutting head is mounted on this base, and both a driving wheel and a driven wheel, on which runs an endless band saw blade for sawing the workpiece, are supported in a freely rotatable and removable manner on this cutting head. Furthermore, in a horizontal-type of band saw machine, a deviation detecting device for detecting the deviations from the vertical cutting line in the workpiece by detecting the amount of distortion of the band saw blade, and a rotating wire brush for brushing off the sawdust adhering to the band saw blade when the workpiece is being sawn, are provided as standard equipment.

In addition, in a horizontal band saw machine which automatically performs a fixed dimension cut on the workpiece, a control means to automatically control the elevation of the cutting head is provided, while a feed vise device for repeating the fixed dimension feeding of the workpiece is provided, which device can freely advance or retreat and placed on the rear section of the main body vise device. In addition, in an automatic horizontal band saw machine, a screw conveyor is provided for discharging from the box-shaped base to the outside the sawdust produced when the workpiece is being sawn.

In any event, in a conventional horizontal band saw machine, the device for detecting the amount of the deviation of the vertical cutting line in the workpiece must be reset by hand for the allowable value for the deviation of the cutting line each time the width of the workpiece to be cut is changed. Accordingly, the relationship between the width of cut and the allowable value for the deviation of the cutting line in the workpiece must be recorded for future reference in a graph or table, and each time that the width of the workpiece to be cut changes, the allowable value for the deviation of the cutting line must be set making reference to the graph or table. This is an extremely troublesome operation.

In addition, in a horizontal band saw machine, when the depth of cut of the band saw blade into the workpiece is excessive, slippage occurs between the band saw blade and the driving wheel, and there is a tendency for the band saw blade to come off the driving wheel. Conventionally, a type of device which detects any change in speed of rotation of the driven wheel has been commonly used as a device to detect when the band saw blade comes off the driving wheel. However, the problem exists that the construction of such a conventional device is extremely complicated, resulting in high cost manufacturing.

In addition, in a horizontal band saw machine, a rotating wire brush is provided for cleaning off the sawdust which adheres to the blade of the band saw when the workpiece is being sawn. However, in a conventional horizontal band saw machine, the operation of replacing this rotating wire brush is not very simple, which is a troublesome problem.

Furthermore, in conventional horizontal band saw machine there is the problem that the band saw blade is exposed in the space between the band saw blade guide member which guides the band saw blade between the driving wheel and the driven wheel, and the housing section which houses the driven wheel, causing a dangerous situation.

In addition to this, in a horizontal band saw machine which automatically feeds the workpiece material at a fixed dimension or length, a feed material vise device which freely advances or retreats, feeding the material at a fixed dimension, after arriving at a previously established position, detects the fact that the workpiece has become shorter than the fixed cut dimension. Specifically, in this conventional machine, after the feed vise device retracts to the set position, a movable vise jaw provided on the feed vise device is operated to grasp the workpiece. Then by detecting whether or not the abovementioned movable vise jaw touched the workpiece, detection is made to determine whether or not the workpiece has become shorter than the fixed cut dimension. Accordingly, a long time is required conventionally until the detection is made as to whether or not the length of the workpiece is adequate. Also, there is the problem that, at the time when the workpiece becomes shorter than the fixed cut dimension, the workpiece can fall into the space between the main body vise device and the feed vise device.

Further, in a conventional horizontal band saw machine, when the sawdust produced by sawing the workpiece is discharged from the inside of the box-shaped base by the screw conveyor, the sawdust little by little gathers into large lumps which become attached to the rotating shaft of the screw conveyor, making it difficult to discharge this sawdust in shape of large lumps. Accordingly, the sawdust adhered to the screw conveyor must occasionally be removed, which is a troublesome operation.

SUMMARY OF THE INVENTION

A first object of the present invention is to provide a band saw machine equipped with a novel revising device which can automatically revise the allowable value for the deviation of cut in proportion to the width of the workpiece to be cut.

This object of the present invention is accomplished by the provision in the present invention of a cut width detection device which automatically detects a dimension which has been set in proportion to the width of the workpiece to be cut, and by the provision of a circuit for revising the allowable value for the deviation of cut, based on the value detected by this cut width detection device.

A second object of the present invention is to provide a band saw machine equipped with a novel saw blade detection device which is simply constructed and can easily detect when the band saw blade has come off the driving wheel.

The objects of the present invention are accomplished by the provision in the present invention of a band saw blade detection device, located close to the driving wheel, which detects the presence or absence of the band saw blade by making contact with this band saw blade.

A third object of the present invention is to provide a band saw machine in which a rotating wire brush for brushing off the sawdust adhering to the band saw blade can be easily removed.

This third object of the present invention is accomplished by the provision in the present invention of a contactable section and a flat surface section formed on one side of a rotating shaft for a rotating wire brush, and by the provision of a circumferential groove formed in a rotating shaft and a removable elastic member on a rotating wire brush.

A fourth object of the present invention is to provide a safe band saw machine equipped with a saw blade guard which covers the exposed section of the band saw blade.

This fourth object of the present invention is accomplished by the provision in the present invention of a freely telescopic saw blade guard which covers the band saw blade between a driven wheel housing section which houses the driven wheel and a band saw blade guide member for guiding the band saw blade.

A fifth object of the present invention is to provide a band saw machine equipped with a novel workpiece detection device which is capable of detecting the fact that the workpiece has become shorter than a fixed dimension or length when a feed vice device for feeding the workpiece material at a fixed dimension is in a retracted position.

This fifth object of the present invention is accomplished by the provision in the present invention of a workpiece detection device which detects the presence or absence of the workpiece on the part of the main body vice device at the side of the feed vice device.

A sixth object of the present invention is to provide a band saw machine equipped with a novel screw conveyor which is capable of smoothly discharging sawdust from inside a box-shaped base.

This sixth object of the present invention is accomplished by the provision in the present invention of a plurality of screw blades in a screw conveyor, wherein a first screw blade on the sawdust receiving side and a second screw blade on the discharge side turn relatively on the same shaft, and are constructed in such a manner that when the sawdust is transferred from the first screw blade to the second screw blade an action is performed to break up the sawdust.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENT

Following is a description of the preferred embodiment of the present invention, taken with reference to the drawings.

Figure 1:
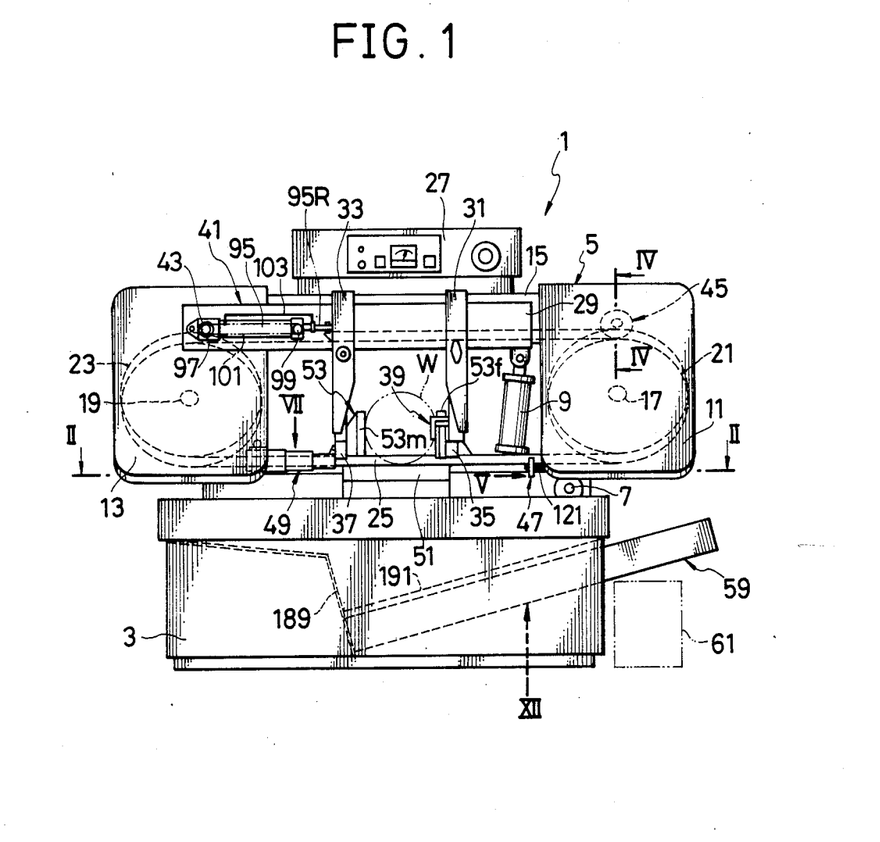
FIG. 1 is a front elevation of an embodiment of the present invention.

Now referring to FIG. 1, a band saw machine 1 is shown comprising a box-shaped base 3 and a cutting head 5 which is freely elevatable in respect to the base 3. In this embodiment of the present invention, the cutting head 5 is attached to the base 3 in a freely elevatable manner through a hinge pin 7, while the elevating operation of the cutting head is performed through the action of an elevating hydraulic cylinder 9 interposed between the base 3 and the cutting head 5.

The cutting head 5 is formed in the shape of the letter C by a housing section 11 and another housing section 13, separated in the left and right directions and connected by a beam member 15. Within the housing sections 11 and 13, a driving wheel 21 and a driven wheel 23 are respectively supported in a freely removable and rotatable manner by a drive shaft 17 and a drive shaft 19. An endless band saw blade 25 runs around the driving wheel 21 and the driven wheel 23.

A control box 27 for controlling the actions of the band saw machine 1 is mounted on the beam member 15 of the cutting head 5, together with a guide rail member 29, which extends in the left and right directions. A fixed guide arm 31 and a movable guide arm 33 are supported perpendicularly on the guide rail member 29 in a freely removable manner. A saw blade guide 35 and a saw blade guide 37 are provided on the lower ends of the guide arms 31 and 33 respectively as band saw blade guide members to guide the band saw blade 25 by twisting it into the perpendicular conditon. As will be later described, a cutting direction detection device 39 for detecting the deviation of vertical cutting line of the band saw blade is mounted on the saw blade guide 35 of the fixed guide arm 31. In addition, an arm moving device 41, which moves automatically and reciprocatingly in the direction approaching the movable guide arm 33 toward the fixed guide arm 31, is mounted on the guide rail member 29, along with a position detecting device 43 for detecting the operating position of the movable guide arm 33.

Furthermore, as will be later explained in detail, a saw blade detection device 45 for detecting when the band saw blade 25 comes off the driving wheel 21 is mounted on the cutting head 5, along with a rotating wire brush 47 for removing the sawdust adhering to the band saw blade 25. A saw blade guard 49 which covers the exposed portion of the band saw blade 25 between the movable arm 33 and the housing section 13 is provided on the cutting head 5.

Figure 2:
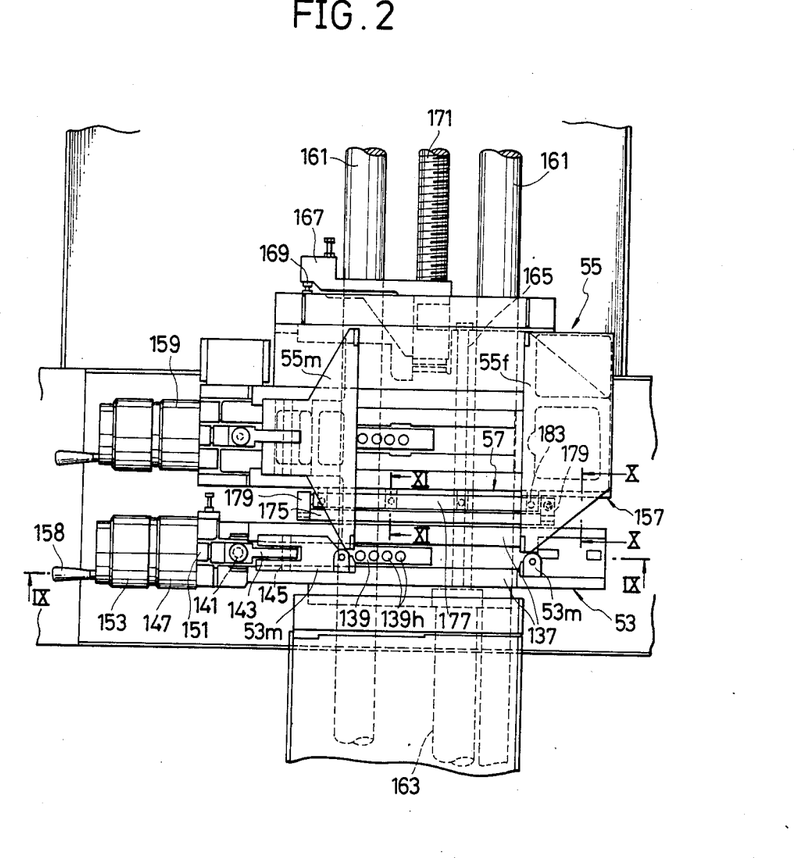
FIG. 2 is a sectional view taken along the line II—II in FIG. 1, showing the main parts of the present invention.

A work table 51 supporting a workpiece W, which is to be sawn, is mounted on the base 3, along with a main body vise device 53 which can freely clamp and secure the workpiece W. As shown in FIG. 2, a feed vise device 55 which feeds the workpiece in a fixed dimension into the main body vise device 53, is provided on the rear portion of the body vise device 53 in a manner to allow free its reciprocating movement in the front and back directions. A workpiece detection device 57, which detects the presence or absence of the workpiece W, is provided on the part of the feed vise device 55 at the main body vise device 53 side. Referring once again to FIG. 1, a screw conveyor device 59, for discharging the sawdust or chips produced during the sawing of the workpiece W to the outside of the base 3, is provided on the base 3. A chip box 61 is positioned below the sawdust discharge section of the screw conveyor 59.

In the configuration described above, the fixed dimension feeding of the workpiece W against the main body vise device 53 is carried out by means of the forward action of the feed vise device 55 when the cutting head 5 is in an elevated status from the action of the elevating hydraulic cylinder 9, and when the workpiece W is secured by the main body vise device 53. In addition, the movable guide arm 33 can be caused to move along the guide rail member 29 by the action of the arm moving device 41, and the space between the fixed guide arm 31 and the movable guide arm 33 is suitably set in proportion to the width of the workpiece W to be cut. Following this, the driven wheel 21 is rotatingly driving causing the band saw blade 25 to run and the cutting head 5 to be lowered by the action of the elevating hydraulic cylinder 9. At this time, the workpiece W is sawn by the band saw blade 25.

While the workpiece W is being sawn by the band saw blade 25, when a curve is caused in the cutting line by producing a twist in the band saw blade 25, the cutting direction or deviation detection device 39 mounted on the fixed guide arm 31 detects the twist in the band saw blade 25 and thus detects the cutting deviation. Accordingly, when the cutting direction detection device 39 detects an excessive cutting deviation, it is able to prevent any breakage of the saw blade and/or producing of damaged or unsuitable goods by terminating instantly the cutting action of the band saw blade 25.

In addition, when an excessive depth of cut is taken in a moment by the band saw blade 25 into the workpiece W during the sawing of the workpiece W, slippage will occur between the driving wheel 21 and the band saw blade 25. When, as a result, the band saw blade 25 comes off the driving wheel 21, this is immediately detected by the action of the saw blade detection device 45. Accordingly, it is possible to prevent the occurrence of an accident attributable to the band saw blade 25 coming off the driving wheel 21 by the operation of the saw blade detection device 45 to, for example, immediately terminate the operation of the band saw machine 1.

As previously outlined, when the cutting head 5 is lowered and the sawing of the workpiece W is carried out, the rotating wire brush 47 cleans off the sawdust which adheres to the band saw blade 25 and eliminates the inconvenience of repeat running of sawdust adhered to the band saw blade 25. The band saw blade 25 between the movable guide arm 33 and the housing section 13 is covered by the saw blade guard 49 so that the safety of the band saw machine is improved. As outlined above, after the workpiece W has been sawn by the band saw blade 25, or after the workpiece W has been secured onto the main body vise device 53 and when the feed vise device 55, which will carry out the next fixed dimension feed, retreats to a specific position, the workpiece detection device 57 operates to detect whether the dimension of the remainder of the workpiece W has become shorter than the fixed cut dimension. Accordingly, when the workpiece W has become too short, this fact is quickly detected, and by immediately interrupting the retreat of the feed vise device 55 by the operation of the workpiece detection device 57, it is possible to support the end of the workpiece W by the feed vise device 55. It is therefore possible to prevent the remainder of the workpiece material from falling between the main body vise device 53 and the feed vise device 55.

Furthermore, the sawdust, resulting from the sawing of the workpiece W, which drops into the base 3 is discharged from the base 3 by means of a screw conveyor device 59, and falls into the chip box 61, so that the sawdust does not accumulate in a pile in the base 3.

Figures 3, 4:
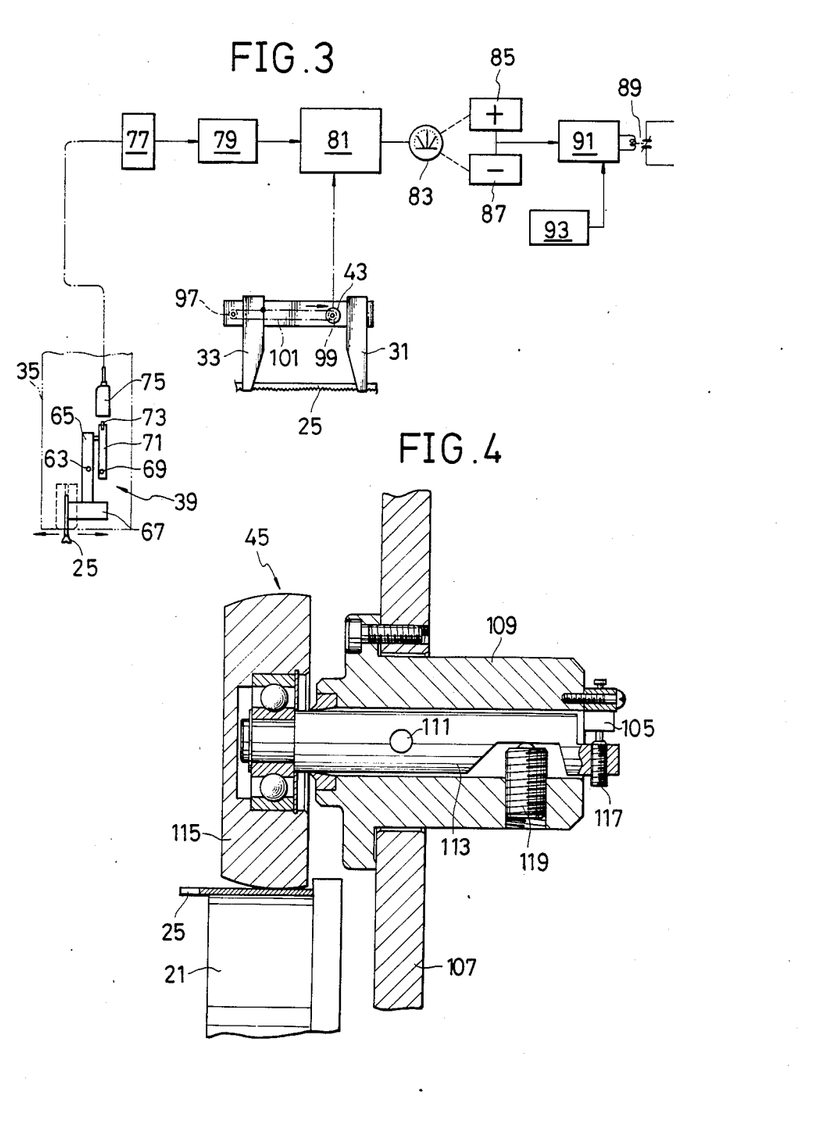
FIG. 3 is a block diagram showing the circuit for compensating the curve of the cutting line.
FIG. 4 is a sectional view sectioned along the line IV—IV in FIG. 1.

Now referring to FIG. 1 and FIG. 3, the cutting deviation detection device 39 is constructed to directly detect the amount of twisting of the band saw blade 25 and thus detect the cutting direction of the workpiece W. Specifically, a detection roller 67 which directly touches the side surface of the band saw blade 25 is rotatably mounted on the lower end of a first rocking rod 65 which is supported rockably on the saw blade guide 35 through a pin 63. The upper end of the first rocking rod 65 is linked to a second rocking rod 71 which is rockably mounted on the saw blade guide 35 through a pin 69. A detected body 73, such as a magnet, is mounted on the upper end of the second rocking rod 71. A magnet sensor 75 opposed to the detected body 73 is mounted on the saw blade guide 35 to detect the movement of the detected body 73.

The magnet sensor 75 is connected to a detector 77, and the detector 77 is connected to an amplifier 79. The detector 77 is constructed to output a voltage proportional to the amount of slippage between the detected body 73 and the magnet sensor 75. The amplifier 79 is connected to a revising circuit 81 which revises the allowable value for the deviation of the cut. The position detecting device 43 is connected to this revising circuit 81.

The revising circuit 81 revises the allowable value for the deviation of the cut proportional to the magnitude of the width of the cut workpiece W to be cut by multiplying the input from the amplifier 79 by an appropriate factor based on the value detected by the position detecting device 43, and is connected to a display device 83, such as, for example, a metal relay. The output voltage from the revising or correction circuit 81 is always a revised value, and the amount of twist of the band saw blade 25 is proportional to the deviation of cut, and is displayed on the display device 83 as the amount of the deviation of cut.

A limiting value detecting section 85 for the plus side of the deviation of cut and a limiting value detecting section 87 for the minus side of the deviation of the cut are provided on the display device 83. Both these cut deviation limiting value sections 85 and 87 are constructed so that when the cut deviation values which correspond to the amount of twist of the band saw blade 25 exceed the allowable value for the detection of cut, a "cut detection over" signal is output. Both these cut deviation limiting value sections 85 and 87 are connected to a relay activating circuit 91 which activates a relay 89 to terminate the sawing action of the band saw blade 25 on the workpiece W. In addition, a cutting activation circuit 93 is connected to the relay activating circuit 91. The cutting activation circuit 93 outputs a signal indicating that the cutting operation is being performed while the band saw blade 25 is sawing the workpiece W. For example, it can be linked to the rotation of the driving wheel 21, or linked to the descent of the cutting head 5, and constructed to output a signal. The relay activating circuit 91 is used to activate the relay 89 under the conditions where there is an output signal from the cutting activation circuit 91, and where there is appropriately an input continues for a certain set time from the cut deviation limiting value sections 85 or 87.

The position detecting device 43, which can be, for example, a potentiometer, detects the distance between the guide arms 31, 33 which has been set to a dimension proportional to the width of cut of the workpiece W being cut by the band saw blade 25. In the embodiment shown in FIG. 1, the position detecting device 43 is coupled to the arm moving device 41 which reciprocally activates the movable guide arm 33 along the guide rail member 29. Specifically, an activating cylinder 95 is suitably mounted on the guide rail member 29 as an arm moving device 41. The tip of a piston rod 95R provided in a reciprocal manner on the activating cylinder 95 is suitably connected to the movable guide arm 33. In addition, a sprocket 97 and a sprocket 99 are respectively mounted in a rotatable manner on the ends of the activating cylinder 95. The sprocket 97 is suitably linked to the position detecting device 43. An endless chain 101 runs on the sprockets 97 and 99. The other end of the connecting member 103 which is connected to the piston rod 95R is connected to one end of the chain 101.

Accordingly, on the activation of the activating cylinder 95, which adjusts the position of the movable guide arm 33 in proportion to the magnitude of the width of workpiece W to be cut, the position detection device 43 is activated through the connecting member 103, the chain 101 and the sprocket 97. For this reason, the position detection device 43 outputs a signal which is proportional to the width of the in the workpiece W.

Further, in FIG. 3, a construction is shown in which the position is adjusted by manual operation of the adjustable guide arm 33. In FIG. 3, the sprockets 97 and 99 are removably supported on the guide rail member 29, and the sprocket 99 and the position detecting device 43 are suitably linked. Then, the chain 101 which runs on the sprockets 97 and 99 and the movable guide arm 33 are directly connected to each other.

As has already been explained, when the band saw blade 25 is twisted while it is sawing the workpiece W, the first and second rocker rods 65 and 71 are suitably rocked through the detection roller 67, and a position deviation is produced between the magnet sensor 75 and the body to be detected 73. A voltage proportional to the amount of position deviation is output from the detector 77. The output from the detector 77 is amplified in the amplifier 79 and is input to the revising circuit 81.

As previously explained, when the adjustment of the position of the movable guide arm 33 is carried out in proportion to the width of the workpiece W to be cut, the position detection device 43 outputs a voltage proportional to the width of the cut in the workpiece W. This voltage is input to the revising circuit 81.

In the revising circuit 81, the input value from the amplifier 79 is revised, based on the input value from the position detection device 43. This revised value is output to the display device 83. The value of the deviation of the cut, based on the revised value, is displayed in the display device 83. When the revised value exceeds the allowable value set in the display device 83, one of the limiting value detecting sections 85 or 87, as appropriate, will output a "deviation of cut limit exceeded" signal to the relay activating circuit 91. In the relay activating circuit 91, the fact that there is an input signal from the cutting activation circuit 93 and the previously mentioned "deviation of cut limit exceeded" signal, under conditions by which there is an intermittent input which exceeds a set time, causes the relay 89 to be activated so that the sawing action of the band saw blade 25 on the workpiece W is immediately terminated. Accordingly, the damage to the band saw blade 25 or production of unsatisfactory product is prevented.

As already explained, in this embodiment of the present invention, in the case where the width of the workpiece W to be cut has changed, a dimension proportional the width is detected and the allowable value for the deviation of the cut is automatically revised so that, for each change in the width of the workpiece, the allowable value for the deviation of the cut is set and further revision is not necessary. The operation is made simple while at the same time the operating efficiency is improved.

Now referring to FIG. 1 and FIG. 4, the saw blade detection device 45, for detecting when the band saw blade 25 has come off the driving wheel 21, is mounted in the housing section 11 which accommodates the driving wheel 21. In more detail, the saw blade detection device 45 is constructed so that when the band saw blade 25 comes off the driving wheel 21 a detection device 105, which may be a device such as a limit switch, is activated. Specifically, the detection device 105 is installed on the outer end of a slip member 109 mounted on a base plate 107 of the housing section 11. The central portion of a rocker member 113 is pivotally supported at the inside of the slip member 109 through a pin 111. A detection roller 115 which freely contacts the band saw blade 25 running on the driving wheel 21 is rotatably supported at the inner end of the rocker member 113. An activating element 117 which activates the detection device 105 is mounted in an adjustable manner at the outer end of the rocker member 113. In addition, a ball plunger 119 for energizing the detection roller 115 to move it toward the driving wheel 21 is mounted at a suitable position on the slip member 109.

Accordingly, when the band saw blade 25 comes off the driving wheel 21, only the thickest portion of the band saw blade 25 is contacted by the rocker member 113, so that the detection device 105 is activated by the activating element 117, which is provided on the rocker member 113. Therefore, it is possible to prevent accidents resulting from the band saw blade 25 coming off the driving wheel 21 by the immediate termination of the action of the band saw 1 when the detection device 105 is activated.

Figure 5:
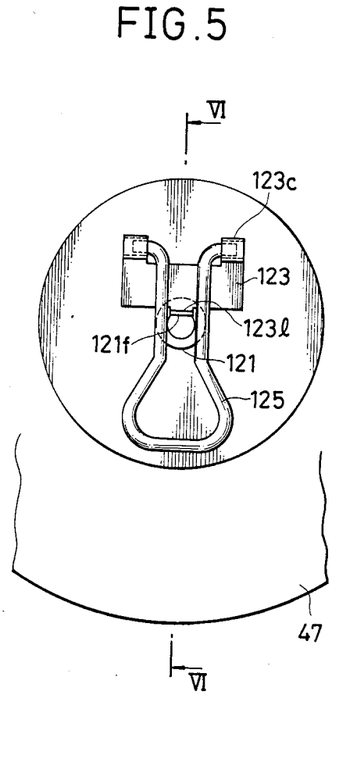
FIG. 5 is an enlarged view taken in the direction of the arrow V in FIG. 1.
Figure 6:
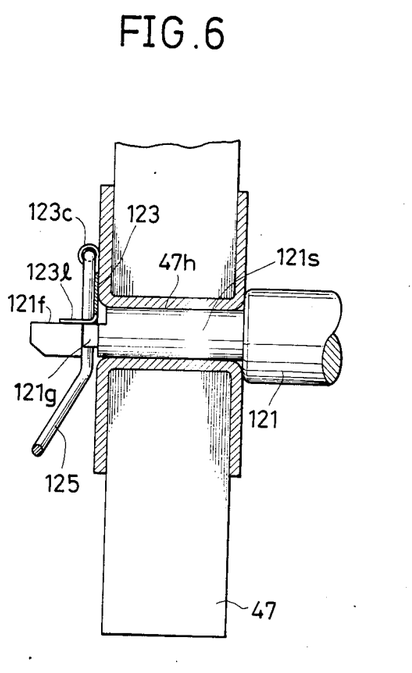
FIG. 6 is a sectional view taken along the line VI—VI in FIG. 5.

Now referring to FIG. 1, FIG. 5 and FIG. 6, the rotating wire brush 47 for dislodging the sawdust adhering to the band saw blade 25 is provided on the underside of the housing section 11 which accommodates the driving wheel 21. In more detail, a brush shaft 121, constructed so that it is suitably and rotatably linked to the drive shaft 17, is provided on the underside of the housing section 11. The rotating wire brush 47 is mounted on the end of this brush shaft 121 in a replaceable or changeable manner.

Specifically, a small diameter section 121S is formed on the end of the brush shaft 121, and in addition a flat section 121f and a circumferential groove section 121g are formed on the end of the small diameter section 121S. A through hole 47h, with which the small diameter section 121S of the brush shaft 121 engages in a freely insertable manner, is formed in the rotating wire brush 47. In addition, a holder plate 123 is mounted on one side surface of the rotating wire brush 47. A bent contact section 123l is formed in the holder plate 123 so as to contact with the flat section 121f of the brush shaft 121. In addition, a curled section 123C is formed on the holder plate 123. A leg section of a removable elastic member 125 which contacts a circumferential groove section of the brush shaft 121 is supported in this curl section 123C. The elastic member 125 is formed from a rod member bent in the shape of U, and both ends of the rod are bent outward to provide flexibility to maintain the contact with the circumferential groove 121g.

From the above configuration it can be clearly understood that the rotating wire brush 47 mounted on the brush shaft 121 rotates integrally with the brush shaft 121 through the medium of the flat section 121f of the brush shaft 121 and the contact section 123l of the holder plate 123. In addition, as a result of the fitting in and removing of the elastic member 125 from the circumferential groove 121g of the brush shaft 121, the installation and removal of the rotating wire brush 47 is easily accomplished.

Figure 7:
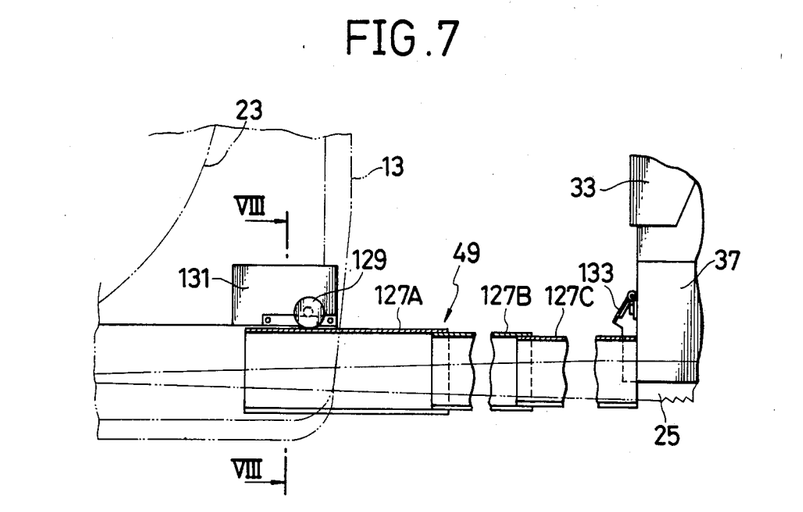
FIG. 7 is an enlarged sectional elevation of the part designated by the arrow VII in FIG. 1.
Figure 8:
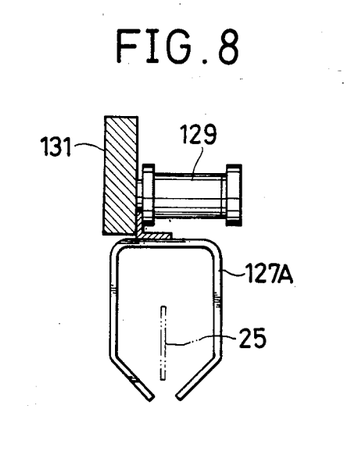
FIG. 8 is an enlarged sectional view taken along the line VIII—VIII in FIG. 7.

Now referring to FIG. 1, FIG. 7 and FIG. 8, the saw blade guard 49, which covers the exposed portion of the band saw blade 25 between the housing section 13 which accommodates the driven wheel 23 and the movable guide arm 33, is provided so that it is freely telescopic, corresponding to the movement of the movable guide arm 33. In more detail, a plurality of telescopic members 127A, 127B and 127C of the saw blade guard 49 are constructed so that they are connected telescopically. Specifically, each of the telescopic members 127A, 127B and 127C is formed almost in the shape of an inverted "U" in section, and are formed in the shape of a horizontal tube with its lower side open. One end of the first telescopic member 127A, which has the largest outer dimensions, is removably mounted, by means of a suitable securing means 129, such as a bolt, on a mounting member 131 provided in the housing section 13.

At the other end of the first telescopic member 127A, one end of the second telescopic member 127B is telescopically inserted. At the other end of the second telescopic member 127B, one end of the third telescopic member 127C is telescopically inserted. The other end of the third telescopic member 127C is pivotally secured through a hinge member 133 so that it can rotate in the upward direction of the saw blade guide 37 which is provided at the lower end of the movable guide arm 33.

As has already been clarified, the saw blade guard 49 expands and contracts telescopically in correspondence with the movement of the movable guide arm 33. Because it covers the exposed portion of the band saw blade 25 between the movable guide arm 33 and the housing section 13, the amount of the band saw blade 25 which is exposed becomes very small thus improving the safety of the sawing operation. In addition, one end of the telescopic member 127A can be disconnected by removal of the connecting means 129. On telescoping, the entire saw blade guard 49 can be rotated in the upward direction, using the hinge member 133 so that the saw blade guard 49 does not become an obstacle when the band saw blade 25 is being changed.

Figure 9:
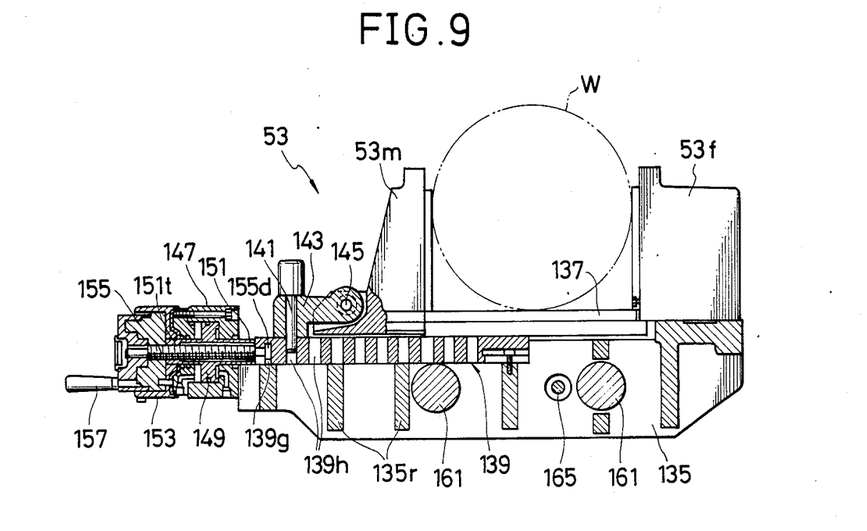
FIG. 9 is a sectional view taken along the line IX—IX in FIG. 2.

Now referring to FIG. 1, FIG. 2 and FIG. 9, the main body vise device 53 for grasping and securing the workpiece W which is to be sawn is provided with a fixed vise jaw 53f for grasping the workpiece W, and a movable vise jaw 53m which can move freely both toward and away from the fixed vise jaw 53f. In more detail, the fixed vise jaw 53f is secured to one end of the upper surface of a suitably formed vise bed 135. The movable vise jaw 53m is removably supported in a movable manner by a pair of guide plates 137 mounted on the upper surface of the vise bed 135. A slide bar 139 is provided at the position beneath the guide plates 137 so as to extend in parallel with the guide plates 137. The slide bar 139 is supported by a plurality of ribs 135r formed in the vise bed 135, so that it can freely move in the longitudinal direction. A plurality of contact elements 139h pierce the slide bar 139 at suitable spacing in the longitudinal direction. On the movable vise jaw 53m, the base section of the pin holder 143 provided on the end of the contact pin 141 which freely makes and breaks contact with the contact element 139h of the slide bar 139, is pivotally supported in a rotatable manner in the vertical direction through a pivot shaft 145 to connect the slide bar 139 and the movable vise jaw 53m.

Accordingly, it is possible to adjust the position of the movable vise jaw relative to the slide bar 139 by selecting the contact position of the contact pin 141 relative to the contact element 139h of the slide bar 139. Specifically, when, for example, the width of cut in the workpiece W is small, the movable vise jaw 53m can move to approach the fixed vise jaw 53f, and the position of the movable vise jaw 53m in correspondence with the width of cut in the workpiece can be adjusted.

A vise cylinder 147 is mounted at one end of the vise bed 135 to cause the reciprocating action of the slide bar 139. A piston 149 is housed in a freely slidable manner in this vise cylinder 149. A piston rod 151 which protrudes from the end of the vise cylinder 147 is integrally provided on both sides of this piston 149. This piston rod 151 is cylindrically formed, and has a female screw section 151t formed at one end, with a cup-shaped handle cover 153 integrally mounted on that end. An adjustable threaded rod 155 which is screwed onto the female screw section 151t of the piston rod 151 perforates the piston rod 151. A disk-shaped section 155d formed at one end of the adjustable threaded rod 155 is rotatably engaged with a contact groove 139g formed at one end of the slide bar 139. In addition, a handle 158 is integrally mounted on the other end of the adjustable threaded rod 155.

As has already been made clear, the slide bar 139 can be caused to perform a suitable reciprocating action through the reciprocating action of the piston 149 of the vise cylinder 147 and by suitable rotation of the adjustable threaded rod 155, using the handle 158. Thus the workpiece W can be grasped and secured by the fixed vise jaw 53f and the movable vise jaw 53m. Furthermore, as outlined above, when the workpiece W is being secured by the fixed vise jaw 53f and the movable vise jaw 53m but the stroke of the vise cylinder 147 is inadequate, the movable vise jaw 53m can be moved closer to the workpiece W by operating the handle 158, so that the workpiece W is reliably grasped and secured.

By means of this embodiment of the present invention, it is possible to make the stroke of the vise cylinder 147 extremely small in order to cause the reciprocating action of the movable vise jaw 53, and the entire construction can be made compact.

In the feed vise device 55, the fixed vise jaw 55f for grasping the workpiece W is secured to the top surface at one end of the vise bed 157, and the movable vise jaw 55m is provided freely movable in the direction in which it approaches or retreats from the fixed vise jaw 55f. In addition, a vise cylinder 159 is provided to produce the reciprocating action of the movable vise jaw 55m. At one end of the movable vise jaw 55m and the fixed vise jaw 55f, the end section of the workpiece W which has become used up but which can still be grasped, protrudes a comparatively long way from the vise bed 157 to the side of the vise device 53. Further, for the feed vise device 55, the construction of the connecting section of the movable vise jaw 55m and the vise cylinder 159 is almost the same as the construction of the main body vise device 53, so details of the feed vise device 55 will be omitted here.

The vise bed 135 of the main body vise device 53 and the vise bed 157 of the feed vise device 55 are removably supported on a pair of support guide bars 161 extending in the front and back directions. A detailed drawing has been omitted, however, both ends of the support guide bars 161 are secured so that it is possible to install and remove them at the base 3. The vise bed 135 of the main body vise device 53 is suitably secured to the support guide bars 161. The vise bed 157 of the feed vise device 55 is slidably mounted on the support guide bars 161. A feed activating cylinder 163 is mounted on one of the support guide bars 161 so that the feed vise device 55 will move in a reciprocating manner along the support guide bars 161. A piston rod 165 of this feed activating cylinder 163 suitably pierces the vise bed 135 on the main body vise device 53 and is suitably connected to the vise bed 137 of the feed vise device 55.

Accordingly, the feed vise device 55 moves reciprocally in the forward and backward directions along the support guide bars 161 by the suitable activation of the feed activating cylinder 163. Therefore, when the feed vise device 55 is activated in the direction to approach the main body vise device 53, the workpiece W is fed into the main body vise device 53 as a result of the grasping of the workpiece W by the movable vise jaw 55m and by the fixed vise jaw 55f on the feed vise device 55.

As outlined above, when the feed vise device 55 retreats moving away from the vise device 53 by means of the action of the feed activating cylinder 163, a stopper member 167 is provided to control the position to which the feed vise device 55 will retreat. A contact detection device 169, which may be a limit switch, is provided on this stopper member 167 to contact the feed vise device 55. When this contact detection device 169 is activated by contacting the feed vise device 55, the action of the feed activating cylinder 163 is terminated, thus terminating the retreat of the feed vise device 55.

The support guide bars 161 and a threaded rod 171 are provided to adjust the position of the stopper member 167. The stopper member 167 is screwed onto the threaded rod 171 in a movable and adjustable manner. A detailed drawing has been omitted. However, the threaded rod 171 pierces the vise bed 157 on the feed vise device 55, and its front end is removably supported in a rotatable manner on the vise bed 135. In addition, the back end of the threaded rod 171 is removably supported in a rotatable manner on the base 3. This threaded rod 171 is connected to a suitable operating device, such as a servo motor or a manual handle.

As has already been explained, the stopper member 167 is moved in the forward direction along the threaded rod 171 by suitable rotation of this threaded rod 171. Accordingly, the stopper member 167 can be positioned in a previously set position, and by such positioning of this stopper member 167 to regulate the position to which the feed vise device 55 can retreat, the dimension by which the workpiece W is fed by the feed vise device 55 can be set. Further, the advance stop position of the feed vise device 55 is the closest position to the vise device 53. Because this is always a fixed position, it is possible to arbitrarily set the feed dimension for the feed vise device 55 by positioning the stopper member 167 at an arbitrary position.

Figure 10:
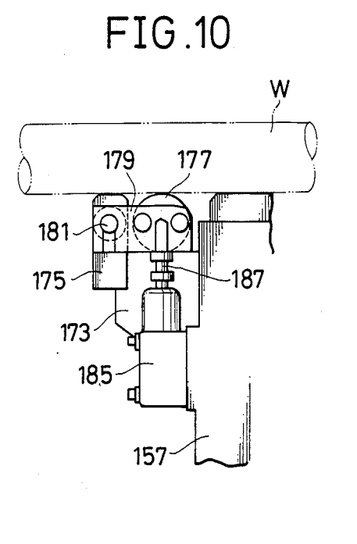
FIG. 10 is an enlarged sectional view taken along the line X—X in FIG. 2.
Figure 11:
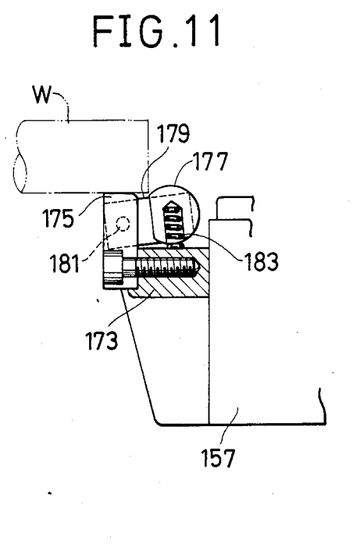
FIG. 11 is an enlarged sectional view taken along the line XI—XI in FIG. 2.

The workpiece detection device 57 detects when the workpiece W is shorter than the fixed dimension cut at the time when the feed vise device 55 is retreating as a result of the action of the feed activating cylinder 163. This workpiece detection device 57 is mounted on the side surface of the feed vise device 55 at the vise device 53 side. In more detail, as shown in FIG. 10 and FIG. 11, a plurality of brackets 173, which project toward the vise device 53 side, is provided on the vise bed 157 of the feed vise device 55. A horizontally extending end support member 175 is integrally secured on the end of these brackets 173, in the longitudinal and tranverse directions of the workpiece W. The upper surface of this end support member 175 is set at almost the same height as the upper surface of the vise bed 157. A workpiece detection bar 177 is positioned in a projectable manner between the end support member 175 and the vise bed 157, opposing the top surface of the vise bed 157.

This workpiece detection bar 177 detects the presence or absence of the workpiece W, and is removably supported to freely swing in the vertical direction of the end support member 175 by a bracket 179, which is secured at both ends, and by a pivot shaft 181. A coil spring 183 energized in the upper direction of the workpiece detection bar 177 is mounted under compression between the workpiece detection bar 177 and the brackets 173, and an activation element 187 which activates a detection device 185, such as a limit switch, mounted on the vise bed 157, is suitably installed on the side of one end of the workpiece detection bar 177.

When there is no workpiece W on the feed vise device 55, the workpiece detection bar 177 is moved upward as a result of the action of the coil spring 183. The activation element 187 moves away from the detection device 185 and the detection device 185 is activated. Accordingly, when the feed vise device 55 retreats owing to the action of the feed activation cylinder 163, the detection device 185 is activated and simultaneously, by the termination of the retreat of the feed vise device 55, the end of the workpiece W becomes supported by the end support member 175. Therefore, even in the case where the workpiece W has become shorter than the fixed cut dimension, the workpiece W does not fall between the main body vise device 53 and the feed vise device 55. In addition, the end of the workpiece W can be grasped by the fixed vise jaw 55f and the movable vise jaw 55m of the feed vise device 55.

Figure 12:
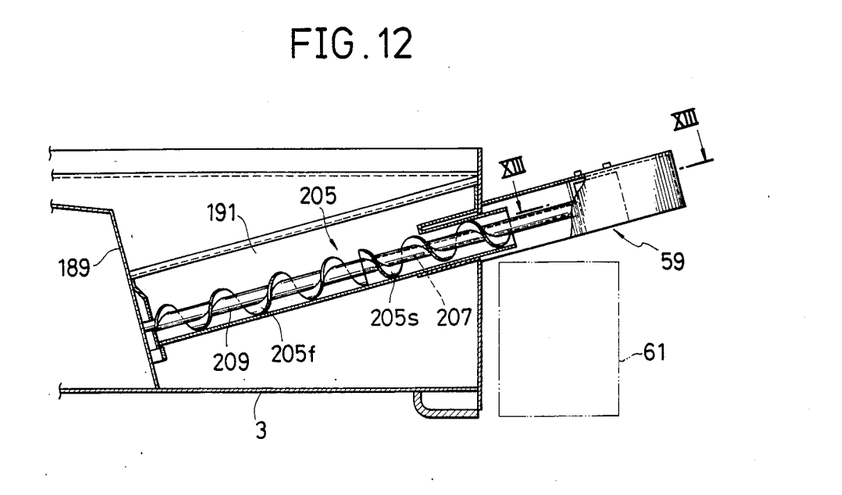
FIG. 12 is an enlarged sectional drawing of the part designated by the arrow XII in FIG. 1.
Figure 13:
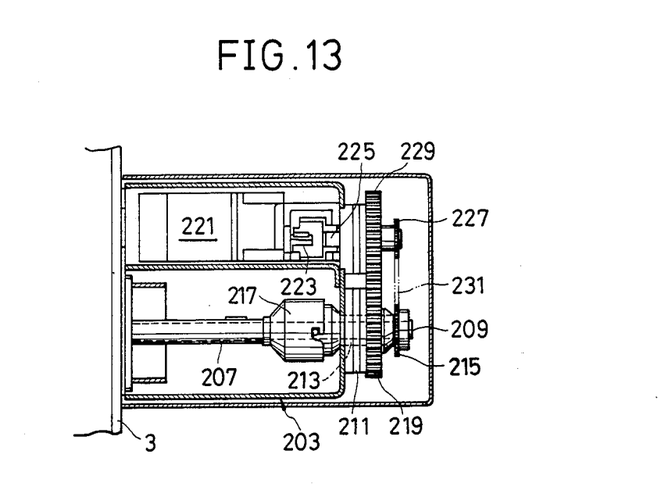
FIG. 13 is an enlarged sectional view taken along the line XIII—XIII in FIG. 12.

Now referring to FIG. 1, FIG. 12 and FIG. 13, the screw conveyor 59 for discharging the sawdust produced by sawing the workpiece W is slantingly installed within the base 3, with one part projecting from the base 3 to the outside. In more detail, a partition member 189 is provided within the base 3 to divide up the interior, while a sawdust receiving plate 191 is provided for receiving the sawdust which falls when the workpiece W is being sawn. The sawdust receiving plate 191 is formed with its cross-section in the form of the letter V. A support frame 203 of a suitable shape is provided on one side surface of the base 3, corresponding to the upper end of the sloped sawdust receiving plate 191. A freely rotatable screw blade 205 is positioned in the lower portion of the sawdust receiving plate 191 for discharging the sawdust received on the sawdust receiving plate 191. The screw blade 205 is divided into a first screw blade 205f on the sawdust receiving side and a second screw blade 205s on the sawdust discharge side. The first screw blade 205f and the second screw blade 205s are positioned on the same axis and wind in opposite directions. A shaft 207 of the second screw blade 205s is constructed in the form of a pipe. One end of a shaft 209 of the first screw blade 205f is rotatably supported by the partition member 189. The other end of the shaft 209 is penetrated by the shaft 207 of the second screw blade 205s, and is rotatably supported by a bearing member 211 mounted on the support frame 203.

In more detail, a hollow shaft 213 is rotatably supported on the bearing member 211, and the other end of the shaft 209 is rotatably supported by penetrating this hollow shaft 213. A large diameter follower sprocket 215 is integrally mounted on one end of the shaft 209. The hollow shaft 213 is connected to the shaft 207 through a suitable coupling 217. A follower sprocket 219 is integrally mounted on the hollow shaft 213.

A suitable drive motor 221 is mounted on the support frame 203 in order to rotatingly drive the screw blade 205. A small diameter driving sprocket 227 and a driving gear 229 engaging with a follower gear 219 of almost the same diameter with the driving gear 229 are integrally mounted on a drive shaft 225 which is rotatably provided and connected to an output shaft 223 of the drive motor 221. A chain 231 runs on the driving sprocket 227 and the follower sprocket 215.

As has already been explained, when the drive motor 221 is rotatably driven, the first screw blade 205f is caused to rotate by the driving sprocket 227, the chain 31 and the follower sprocket 215, and the second screw blade 205s is caused to rotate by the driving gear 229 and the follower gear 219. As a result of this configuration, the first screw blade 205f and the second screw blade 205s are caused to rotate in opposite directions, and the second screw blade 205s rotates at a higher RPM than the first screw blade 205f. Accordingly, when the sawdust transported to the second screw blade 205s by the first screw blade 205f is transferred to the second screw blade 205s, that sawdust is cut into pieces and discharged as a certain size of lump by the second screw blade 205s. As a result, the sawdust does not form into oversized lumps and can therefore be discharged smoothly. Furthermore, in the above embodiment of the present invention, both the winding direction and direction of rotation of the first screw blade 205f and the second screw blade 205s are reversed, and the second screw blade 205s rotates at the higher RPM. Furthermore, it is also possible for the first screw blade 205f and the second screw blade 205s to rotate at a uniform velocity in opposite directions. In addition, the winding direction of the first screw blade 205f and the second screw blade 205s can be the same and the direction of rotation can be the same. Furthermore, in this embodiment of the present invention, the first screw blade 205f and the second screw blade 205s can be driven by one drive motor, as has been explained. However, as may readily be understood, a structure by which the first screw blade 205f and the second screw blade 205s are driven by separate and individual motors is also possible to employ.

Although a preferred form of the present invention has been illustrated described, it should be understood that the device is capable of modification by one skilled in the art without departing from the principles of the invention. Accordingly, the scope of the invention is to be limited only by the claims appended hereto.

We claim:

1. A band saw machine comprising:
   a base;
   means for fixing a workpiece relative to said base;
   a cutting head elevatable on said base;
   an endless band saw blade contained within said cutting head and mounted for driving movement relative to said base to provide a cutting action of said saw blade against said workpiece;
   a fixed guide arm mounted on said cutting head cutting positioned in proximity to said saw blade;
   a movable guide arm mounted on said cutting head position in proximity to said saw blade;
   means for moving said movable guide arm with respect to said fixed guide arm so as to position said fixed and movable guide arms in proportion to the width of said workpiece;
   means associated with at least one of said fixed and movable guide arms for detecting the position of said movable guide arm relative to said fixed guide arm thereby detecting a dimension proportional to the width of said workpiece to be cut;
   means mounted on one of said fixed and movable guide arms for detecting the cutting deviation of the saw blade on said workpiece; and
   means connected to said means for detecting the position of said movable guide arm relative to said fixed guide arm for revising the cutting deviation detector means in response to the detection of said dimension proportional to width of the workpiece to be cut.

2. The band saw machine of claim 1 in which said movable guide arm is moved automatically relative to said fixed arm so as to position said fixed and movable guide arms in proportion to the width of said workpiece.

3. The band saw machine of claim 1 in which said movable guide arm is moved manually relative to said fixed arm so as to position said fixed and movable guide arms in proportion to the width of said workpiece.

* * * * *